(12) United States Patent
Chen et al.

(10) Patent No.: US 6,804,761 B1
(45) Date of Patent: Oct. 12, 2004

(54) MEMORY ALLOCATION SYSTEM AND METHOD

(75) Inventors: Enke Chen, San Jose, CA (US); Srihari Ramachandra, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/489,553

(22) Filed: Jan. 21, 2000

(51) Int. Cl.[7] ............................................... G06F 12/00
(52) U.S. Cl. ...................... 711/170; 711/172; 711/171; 345/543; 710/56; 707/205
(58) Field of Search ................................ 711/170–172; 345/543; 709/104; 710/56; 700/99; 707/205

(56) References Cited

U.S. PATENT DOCUMENTS

| | | | | |
|---|---|---|---|---|
| 5,235,690 A | * | 8/1993 | Beardsley et al. | 711/113 |
| 5,481,702 A | * | 1/1996 | Takahashi | 707/205 |
| 5,652,864 A | * | 7/1997 | Hine | 711/171 |
| 5,675,790 A | * | 10/1997 | Walls | 707/205 |
| 5,784,699 A | * | 7/1998 | McMahon et al. | 711/171 |
| 5,802,599 A | * | 9/1998 | Cabrera et al. | 711/170 |
| 5,930,827 A | * | 7/1999 | Sturges | 711/170 |
| 6,088,764 A | * | 7/2000 | Shyam et al. | 711/112 |
| 6,094,707 A | * | 7/2000 | Sokolov et al. | 711/113 |
| 6,490,670 B1 | * | 12/2002 | Collins et al. | 711/173 |
| 6,629,111 B1 | * | 9/2003 | Stine et al. | 707/205 |
| 6,640,290 B1 | * | 10/2003 | Forin et al. | 711/156 |

* cited by examiner

Primary Examiner—Nasser Moazzami
(74) Attorney, Agent, or Firm—Ritter, Lang & Kaplan LLP

(57) ABSTRACT

A method of allocating computer memory for a function in a computer program by a chunk manager operable to interface with an operating system of a computer program. The method includes receiving a request for a block of memory for a function in the computer program. The request is modified such that the size of the requested block corresponds to a standard block size selected from a list of standard block sizes. The method further includes locating a first available block of memory having a size within a predefined range around the requested block size. A system for allocating computer memory is also disclosed.

24 Claims, 5 Drawing Sheets

MEMORY ALLOCATION SYSTEM AND METHOD

BACKGROUND OF THE INVENTION

The present invention relates generally to computer memory systems, and more particularly, to the management of memory allocation.

Computer operating systems dynamically allocate memory in a computer system while executing programs. Computer memory is allocated to the executing program for use by functions within the program. When the functions are completed, the memory allocated for the functions are typically de-allocated. Frequent allocation and de-allocation of a large number of fixed size data structures may result in memory fragmentation, which can lead to performance degradation or even malfunctions.

Dynamic memory allocation is a technique in which programs determine as they are running where to store information. Dynamic allocation is used when the number of memory blocks needed, or the length of time needed, depends on the data being processed. For example, a block may be needed to store a line read from an input file. Since there is no limit to how long a line can be, the storage must be allocated dynamically, and made dynamically larger as more of the line is read. Also, a block may be needed for each record or each definition in the input data. Since it is not known in advance how many records there will be, a new block must be allocated for each record as it is read. In order to improve efficiency, when an amount of memory is requested, a higher amount of memory defined as a "chunk" may be allocated.

A chunk manager is often used to manage chunk memory allocation from an operating system to an application. The chunk manager allocates large blocks of memory chunks and then subdivides the blocks into smaller fixed size blocks (chunk elements) that can be used for fixed size data structures. FIG. 1 illustrates a memory chunk C subdivided into a plurality of chunk elements E, with allocated blocks indicated with shading. An application may request 50 elements having 100 bytes each from a chunk manager, for example. The chunk manager will then request a 5,000 byte block containing a plurality of smaller size block elements and allocate this memory to the application. Individual block elements within the large block may be used by the application and then returned at various times while the application is running. As memory blocks are allocated and deallocated during system operation, the memory fragments and free blocks are located between used ones (see FIG. 1). When the memory is fragmented, there may be a large amount of total free space, but each block may be too small for use by applications to store data. For example, an application may request a chunk of memory which is less than the total free memory, but not available as one chunk due to fragmentation of the system memory. As data structures in a system differ in the size and dynamicity of allocation and de-allocation, memory chunks of different sizes have to be used to conserve memory. Since the sizes of memory chunks differ, frequent allocation and de-allocation of elements often leads to memory fragmentation which may result in system performance degradation and malfunctions.

There is, therefore, a need for a chunk manager that allows for flexibility in the size of chunks allocated to increase the availability of memory blocks and reduce errors encountered due to memory fragmentation.

SUMMARY OF THE INVENTION

A memory allocation system and method are disclosed. A method of the present invention is for allocating computer memory for a function in a computer program by a chunk manager operable to interface with an operating system of a computer and the program. The method generally includes receiving a request for a block of memory for a function in the computer program. The request is modified such that the size of the requested block corresponds to a standard block size selected from a list of standard block sizes. The method further includes locating a first available block of memory having a size within a predefined range around the requested block size.

A system for allocating computer memory generally comprises a chunk manager operable to receive a request from a computer program for a block of memory and modify the request such that the size of the requested memory block corresponds to a standard block size. The chunk manager is further operable to locate a first available block of memory having a size within a predefined range around the requested block size.

In another aspect of the invention, a computer system generally includes a central processing unit coupled to a memory unit. The memory comprises a memory array for storing data comprising data bits. The memory stores the data within the array in memory chunks, each memory chunk being divided into a plurality of memory elements having predefined number of data bits. The system further includes a chunk manager operable to allocate variable sized memory chunks to a computer application. The chunks are allocated based on a predefined allowable range around a chunk size requested by a program.

A computer program product for allocating computer memory generally comprises computer code that allows the chunk manager to receive a request for a block of memory for a function in a computer program. The product further includes computer code that modifies the request such that the size of the requested block corresponds to a standard block size selected from a list of standard block sizes, computer code that locates a first available block of memory having a size within a predefined range around the requested block size, and a computer readable medium that stores the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A memory allocation system of the present invention may be used on a workstation coupled to a central computer system in a multi-tasking, multi-user environment, such as a local area network (LAN) or client-server configuration or a stand-alone system, for example. Examples of such distributed computing environments include local area networks of an office, enterprise wide area networks (WAN), and the global Internet. It is to be understood that the programs, processes, and methods described herein are not limited to any particular computer or apparatus, nor are they limited to any particular communication network architecture. Various types of general purpose machines may be used with program modules constructed in accordance with the invention described herein.

Figure 2:
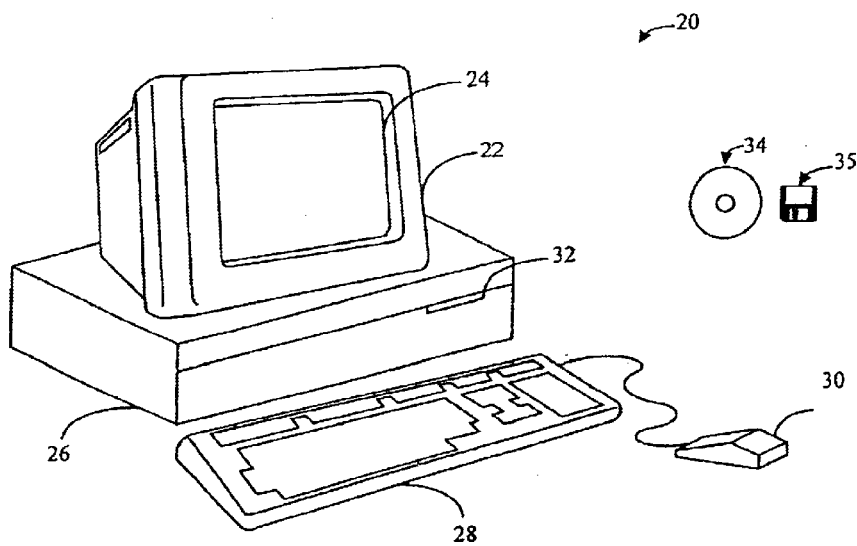
FIG. 2 is a schematic illustrating an example of a computer system that can be utilized to execute software of an embodiment of the invention.

FIG. 2 illustrates an example of a computer system that can be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and fixed storage 44 (see FIG. 3) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 3:
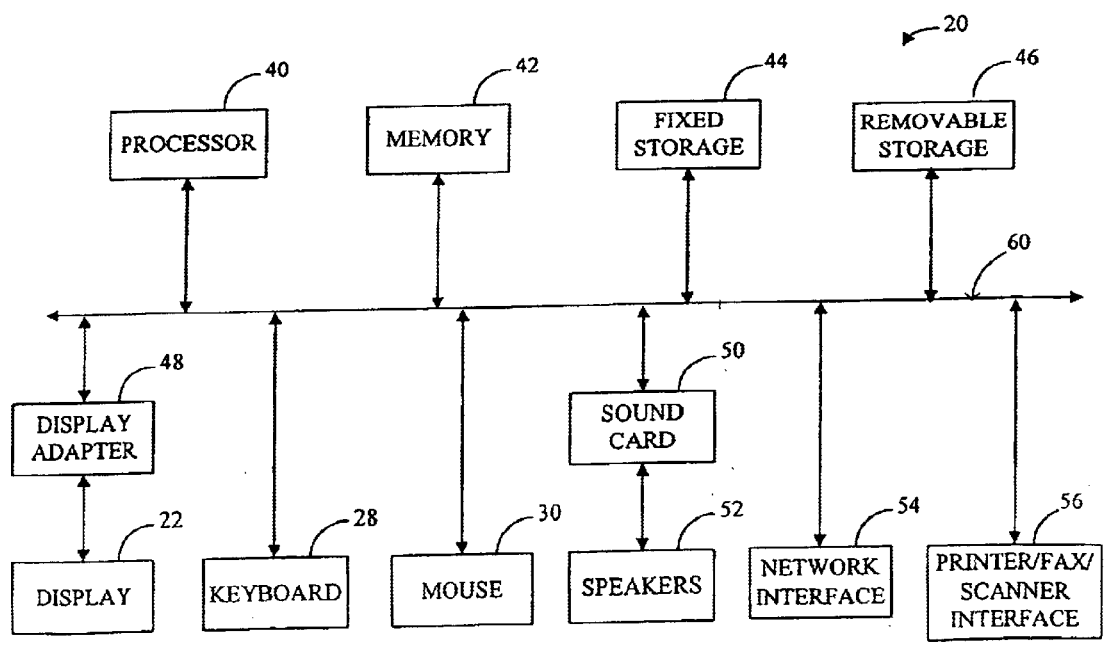
FIG. 3 is a system block diagram of the computer system of FIG. 2.

FIG. 3 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 3. However, these arrows are only illustrative of one possible interconnection scheme serving to link the subsystems. For example, a local bus could be utilized to connect the central processor 40 to the system memory 42 and display adapter 48. Computer system 20 shown in FIGS. 2 and 3 is but an example of a computer system suitable for use with the invention. Other computer architectures having different configurations of subsystems may also be utilized.

Figure 4:
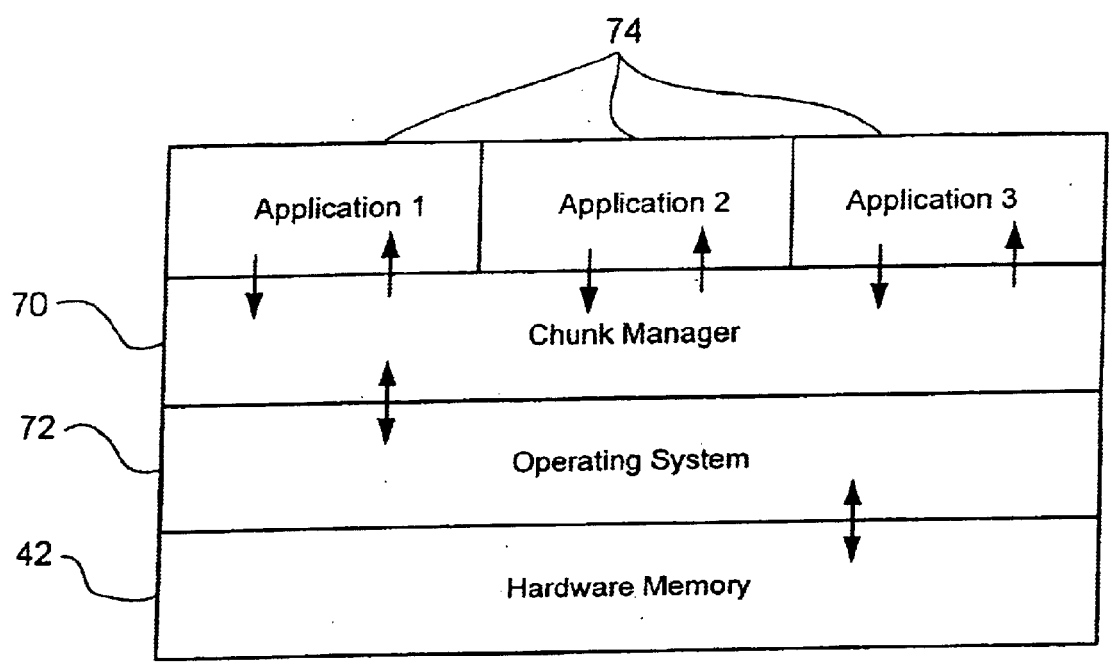
FIG. 4 is a schematic of a chunk manager configured to interface with applications and an operating system.

A chunk manager 70 of the present invention provides for memory allocation between an operating system 72 and one or more applications (programs) 74 (FIG. 4). The applications or programs 74 may be user-applications, server-type programs that provide services for applications, or network applications such as routing protocols, for example. It is to be understood that the terms computer, operating system, and application or program generally include all types of computers and program modules designed for them. The program modules such as an operating system, programs, and data files are provided to the computer via one of the local memory storage devices 34, 35, 42, 44 or remote memory storage devices (not shown). The local hard disk drive 44 may be used to store data and programs, including the operating system 72, for example. Portions of the operating system 72, applications 74, and data files may be loaded into RAM from a large storage medium such as the hard disk drive 44, for access by the central processing unit (CPU) 40.

The chunk manager 70 manages memory allocation to applications 74 running on the computer 20 (FIGS. 2 and 4). The chunk manager 70 is positioned between the applications 74 and the operating system 72. The operating system 72 interfaces with the hardware (e.g., computer, display, input devices) that is adapted to operate utilizing various software programs. The chunk manager 70 controls the allocation of memory chunks to each process and operates to track which parts of allocated memory are unused, request new memory for the processes, and label memory as unused when that memory is no longer needed by the process which requested the memory.

Figure 1:
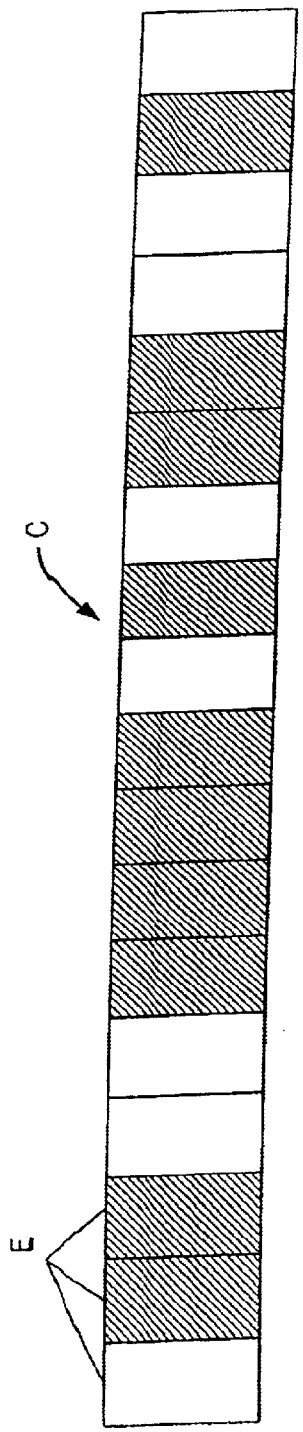
FIG. 1 is a schematic of a memory chunk having a plurality of chunk elements, with allocated elements shown shaded.
Figure 5:
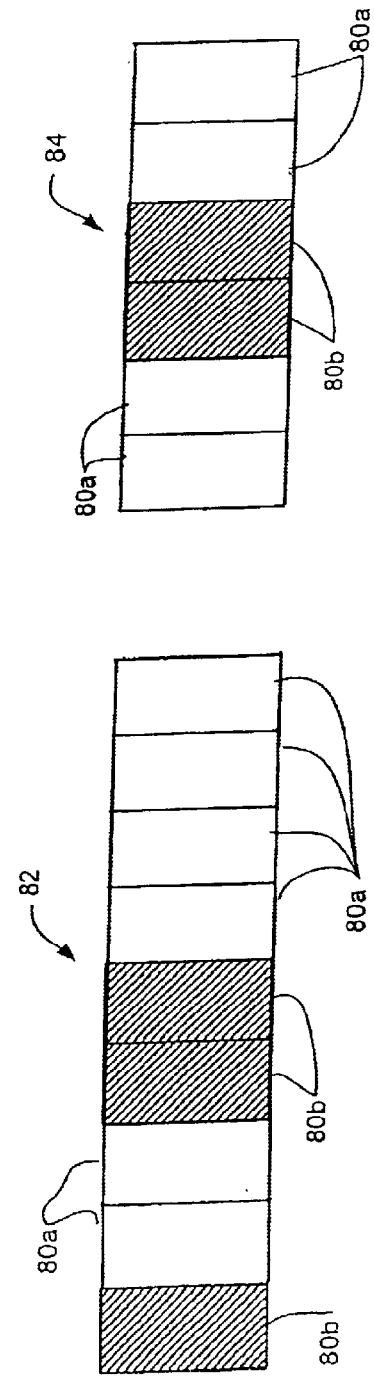
FIG. 5 is a schematic illustrating various sized chunk siblings containing a plurality of chunk elements.

FIG. 5 is a memory map diagram showing a series of contiguous memory locations or elements 80a, 80b within two memory chunks (chunk siblings) 82, 84. Each of the elements 80a, 80b is a discrete region of memory. Elements 80a are free locations and elements 80b are allocated. A large block of memory (chunk sibling) 82, 84 is allocated to a specific application and then subdivided into smaller fixed size blocks (chunk elements 80a, 80b), which can be used for the fixed size data structures. The memory locations may be occupied by a data file that is retrieved from a memory storage device or network interface or stored within the computer system's RAM so that it can be accessed and operated upon by the operating system 72 or a program 74, for example (FIGS. 4 and 5). Regions or fragments of free memory 80a within the chunk siblings 82, 84 may be created by data processing operations such as deletion. This free space 80a may be utilized if required to store newly created data items, or the space may remain empty. When all of the elements of a chunk sibling 82, 84 are de-allocated, the chunk is freed. The chunk 82, 84 is preferably dynamic which means that a new chunk sibling is allocated by the chunk manager 70 after all the current unused chunk elements 80a are used. Similarly a chunk sibling 82, 84 will be freed when all of its chunk elements 80a, 80b are unused. The chunk manager 70 allocates and frees chunk siblings depending on how the application is allocating chunk elements without any other intervention or knowledge by the application.

When additional memory is requested, the chunk manager 70 does not simply request a memory chunk in the size requested by the application, as with prior art systems. Instead it varies the size of the requested memory chunk to preserve larger blocks when smaller sized blocks of memory are available to reduce the amount of memory fragmentation. The chunk manager 70 preferably allocates blocks of memories in predefined standard block sizes such as 1 k, 3 k, 7 k, 10 k, 32 k, and 64 k. The memory pool includes lists of these standard block sizes. Each list may include blocks having sizes other than the specified standard size. For example, the 1 k block list may include blocks having a minimum size of 1 k and a maximum size less than 3 k (e.g., 3 k–1). When an application 74 requests a block of memory, the chunk manager 70 modifies the request to instead look for a block with the next highest size standard memory block. For example, if an application requests 2.5 k bytes of memory, the chunk manager 70 will look for a 3 k standard block of memory (i.e., 3 k to 7 k–1) to allocate to the application. Fragmentation is reduced by setting aside standard size blocks of memory for applications. It is to be understood that the system may create standard block size lists different than described above. For example, the system may create standard block sizes of 1 k, 2.5 k, 10 k, 16 k, 32 k, and 64 k.

In order to further reduce memory fragmentation, when the chunk manager 70 searches for free blocks of memory to allocate to the application, it will allocate the first free block it encounters having a block size within a predefined range (e.g., 50% to 200% of the requested memory block size). The percentage difference in the new block size when compared to the requested size can be controlled by having more granular memory pool sizes in the operation system. Thus, an allocation request for a chunk sibling 82, 84 may be satisfied by the chunk manager 70 providing an available block having a size close to the requested size. The memory blocks provided in response to a request for memory may be less than, equal to, or greater than the block size requested. If a larger block 82, 84 then needed by the application is provided, it will be held by the chunk manager 70 with individual elements 80a, 80b allocated to the application, as they are needed. When the entire block 82, 84 is freed the chunk manager 70 will return the chunk sibling to the system memory. The application 74 will not notice that the number of chunk elements received is different than requested, since the size of the chunk elements 80a, 80b that are given to the application remains the same.

Figure 6:
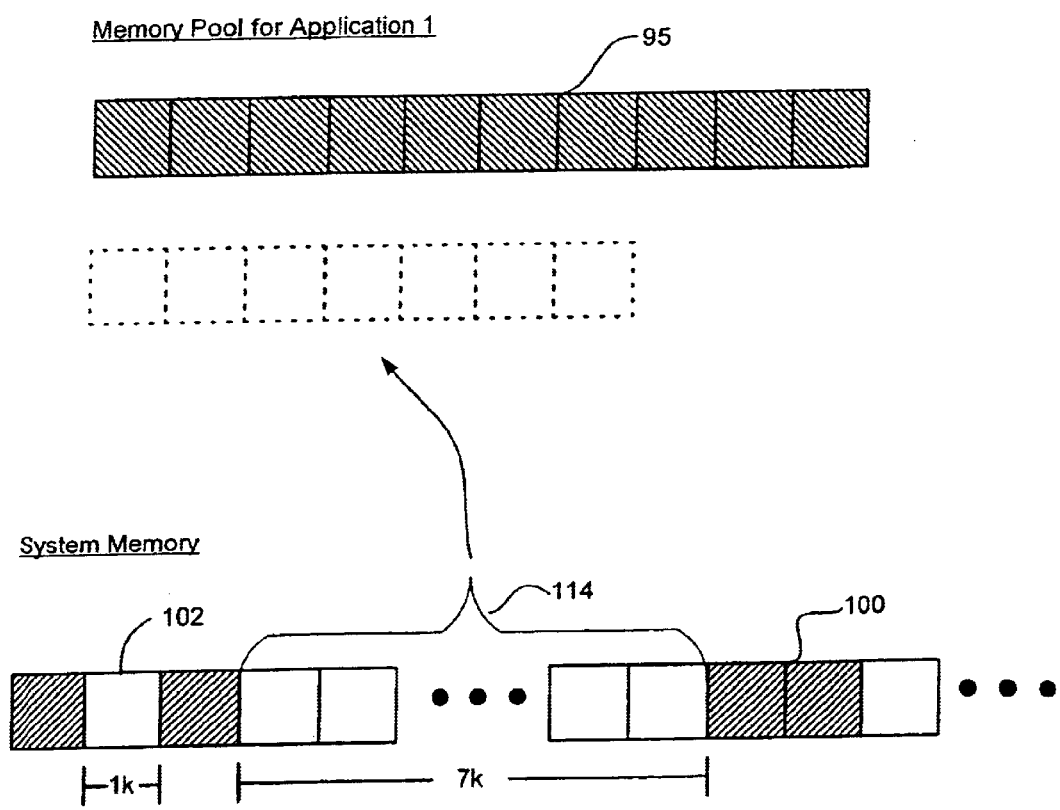
FIG. 6 is a diagram illustrating exemplary memory allocation performed by a chunk manager of the present invention.

FIG. 6 is a diagram illustrating memory allocation by the chunk manager 70. Upon initialization of a program, memory is allocated into a memory pool comprising a number of memory elements of varying size (FIG. 6). In response to a memory allocation request during execution of the application, the memory pool is scanned to locate a memory element of the appropriate size to meet the specifications of the allocation request. If the application requests additional memory elements which are not available within the memory pool allocated for the application, the chunk manager 70 will request a new chunk sibling from the operating system memory according to the block size criteria described above. This process is further described below with respect to FIG. 7.

Figure 7:
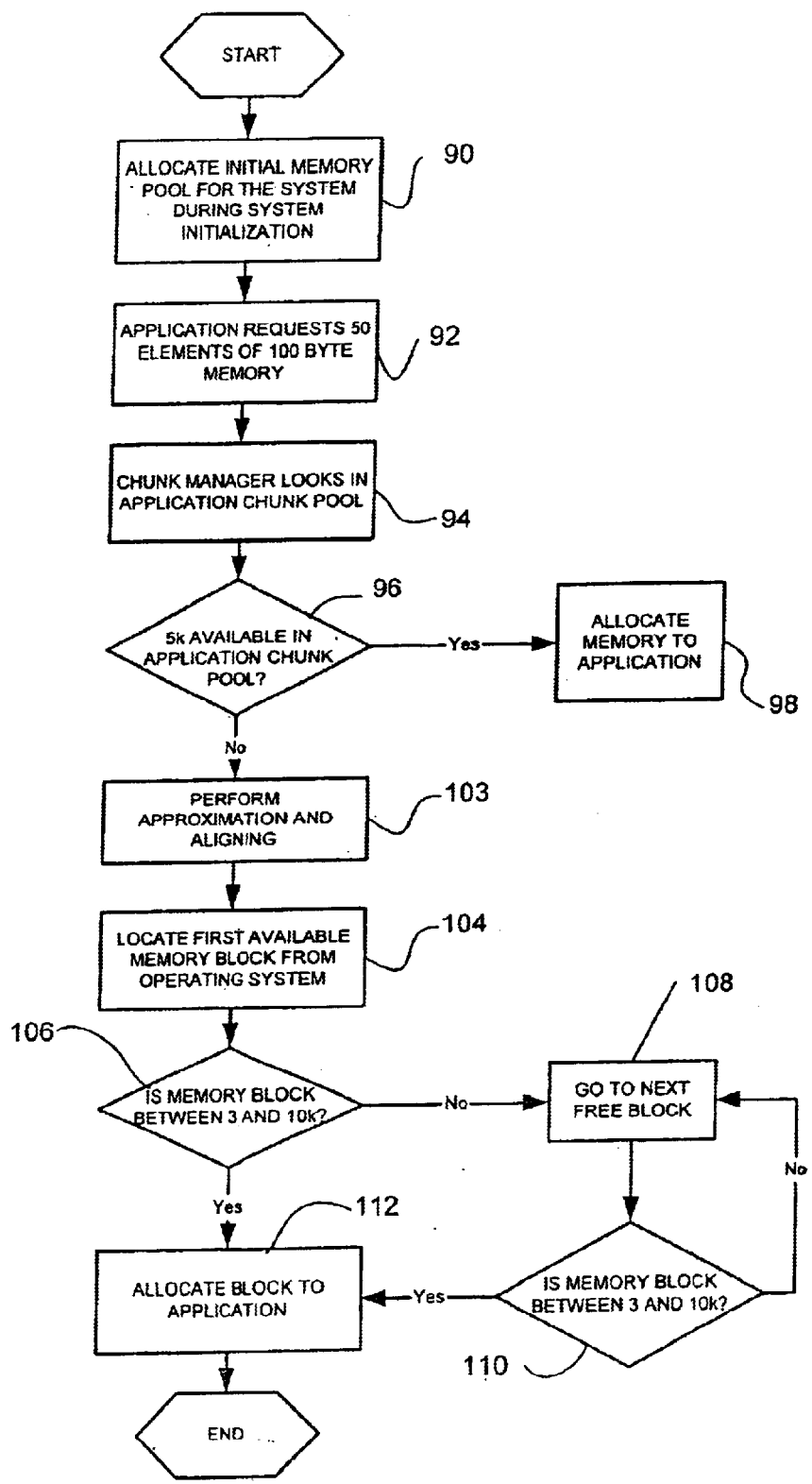
FIG. 7 is a flowchart illustrating a process for allocating memory with the chunk manager of FIG. 4.

FIG. 7 is a flowchart illustrating a process for allocating and de-allocating memory by the chunk manager 70. At step 90 an initial chunk 95 is allocated to the memory pool for an application during system initialization (FIGS. 6 and 7). The application then requests 50 blocks of 100 byte elements (step 92). The chunk manager 70 first looks in the memory pool to see if any elements are available (step 94). If elements are available they are allocated to the application (steps 96 and 98). If there is no free memory or insufficient memory, the chunk manager 70 requests additional memory from the operating system 72. The chunk manager 70 first aligns the requested chunk size to one of the predefined chunk sizes (e.g., 1 k, 3 k, 7 k, 10 k, 32 k, and 64 k). Since 5 k of memory was requested, the chunk manager 70 will request a standard 7 k block size (e.g., the next largest standard block size). However, as described above, in order to reduce memory fragmentation within the system memory 100, the chunk manger will accept any block having a size close to the requested size. If the range is defined as within 50%–200% of the requested size, the chunk manager 70 will accept a memory chunk having a size of 3 k to 10 k. The chunk manger 70 performs approximation and aligning (step 103) and scans the system memory to find the first available block (step 104). As shown in FIG. 6, the first free block 102 is 1 k. Since this is not within the acceptable range, it moves on to the next free block 114 which is 7 k and within the acceptable range (steps 106, 108, and 100). The chunk manager 70 then creates another chunk sibling by allocating the 7 k block 114 to the application's memory pool, as indicated in phantom in FIG. 6 (step 112). If the entire 7 k block 114 is later freed it will be released by the chunk manger 70 and returned to the system memory.

It is to be understood that the specific steps or order of steps may be different than described above and the standard block sizes or the range around the requested block size may be different than described herein without departing from the scope of the invention. For example, the acceptable range of block sizes may be based on the standard block size rather than the requested block size.

As can be observed from the foregoing, the flexibility provided by the chunk manger 70 as to the size of the memory block that can satisfy a memory allocation request helps to preserve larger blocks when smaller sized blocks of memory are available, resulting in a reduction in memory fragmentation.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method of allocating computer memory for a function in a computer program by a chunk manager operable to interface with an operating system of a computer and the program, the method comprising:

allocating a chunk of memory to a memory pool;

receiving a request for a block of memory for a function in the computer program;

searching the memory pool containing a plurality of memory elements varying in size for said requested block of memory;

if insufficient memory is available in said memory pool, modifying the request such that the size of the requested block corresponds to a standard block size selected from a list of standard block sizes, and searching system memory in the operating system to locate a first available block of memory having a size within a predefined range around the modified requested block size, wherein the predefined range includes block sizes smaller than and greater than the requested block size; and allocating said available block of memory to said function in the computer program memory pool.

2. The method of claim 1 wherein the predefined range is between 50% and 200% of the requested block size.

3. The method of claim 1 wherein the computer program is a routing protocol.

4. The method of claim 1 wherein modifying the request comprises increasing the requested block size to the next higher standard block size.

5. The method of claim 1 wherein receiving a request for a block of memory comprises scanning a memory pool to locate a memory element and receiving a request from a chunk manager for a new chunk if a memory element of appropriate size is not available.

6. The method of claim 1 wherein the list of standard block sizes includes blocks having a minimum size and a maximum size.

7. The method of claim 1 wherein the standard block sizes include 1 k, 3 k, 7 k, 10 k, 32 k, and 64 k blocks.

8. The method of claim 1 wherein the standard block sizes range from 1 k to 64 k blocks.

9. The method of claim 1 wherein the list of standard block sizes includes at least six different block sizes.

10. The method of claim 1 wherein the memory pool further includes the predefined range.

11. The method of claim 1 further comprising releasing a block of memory by the chunk manager when the block of memory is no longer in use.

12. A system for allocating computer memory comprising a chunk manger operable to allocate a chunk of memory to a memory pool, receive a request from a computer program for a block of memory, search the memory pool containing a plurality of memory elements varying in size for said requested block of memory; modify said request such that the size of the requested memory block corresponds to at least one of the standard block sizes if insufficient memory is available in said memory pool, locate a first available block of memory having a size within a predefined range around the modified requested block size, and allocate said located available block of memory to said computer program, wherein the predefined range includes block sizes smaller than and greater than the requested block size.

13. The system of claim 12 wherein the said predefined range is between 50% and 200% of the requested block size.

14. A computer system including a central processing unit coupled to a memory, the memory comprising a memory array for storing data comprising data bits and a list of standard block sizes, said memory storing said data within said array in memory chunks, each of said memory chunks being divided into a plurality of memory elements having a predefined number of said data bits, and a chunk manager operable to allocate variable sized memory chunks to a computer program, the chunks being allocated based on a predefined allowable range around a chunk size requested by a computer program running on the computer system, wherein the predefined range includes block sizes smaller than and greater than the requested block size.

15. The computer system of claim 14 wherein the predefined range is between 50% and 200% of the requested block size.

16. The computer system of claim 14 wherein the computer program is a routing protocol.

17. The computer system of claim 14 wherein the list of standard block sizes includes blocks having a minimum size and a maximum size.

18. The computer system of claim 14 wherein the standard block sizes range approximately from 1 k to 64 k blocks.

19. The computer system of claim 14 wherein the list of standard block sizes includes at least six different block sizes.

20. A computer program product for allocating computer memory for a computer program by a chunk manager operable to interface with an operating system and the computer program, the product comprising:

computer code that allocates a chunk of memory to a memory pool;

computer code that allows the chunk manager to receive a request for a block of memory for a function in the computer program;

computer code that searches a memory pool containing a plurality of memory elements varying in size for said requested block of memory;

computer code that modifies the request such that the size of the requested block corresponds to at least one standard block size selected from a list of standard block sizes if insufficient memory is available in said memory pool;

computer code that searches system memory in the operating system to locate a first available block of memory having a size within a predefined range around the modified requested block size, wherein the predefined range includes block sizes smaller than and greater than the requested block size;

computer code that allocates said located available block of memory to said function in the computer program; and a computer readable medium that stores the computer codes.

21. The computer program product of claim 20 wherein the computer readable medium is selected from a group consisting of CD-ROM, floppy disk, zip disk, tape, flash memory, system memory, hard drive, and data signal embodied in a carrier wave.

22. A system for allocating computer memory for a function in a computer program by a chunk manager operable to interface with an operating system of a computer and the program, the system comprising:

means for allocating a chunk of memory to a memory pool;

means for receiving a request for a block of memory for a function in the computer program;

means for searching a memory pool containing a plurality of memory elements varying in size for said requested block of memory;

if insufficient memory is available in said memory pool, modifying the request such that the size of the requested block corresponds to a standard block size selected from a list of standard block sizes, and searching system memory in the operating system to locate a first available block of memory having a size within a predefined range around the modified requested block size, wherein the predefined range includes block sizes smaller than and greater than the requested block size; and allocating said available block of memory to said function in the computer program.

23. The system of claim 22 wherein the predefined range is between 50% and 200% of the requested block size.

24. The system of claim 22 wherein the computer program is a routing protocol.

* * * * *